United States Patent [19]

Chen

[11] Patent Number: 5,257,133
[45] Date of Patent: Oct. 26, 1993

[54] RE-IMAGING OPTICAL SYSTEM EMPLOYING REFRACTIVE AND DIFFRACTIVE OPTICAL ELEMENTS

[75] Inventor: Chungte W. Chen, Irvine, Calif.

[73] Assignee: Hughes Aircraft Company, Los Angeles, Calif.

[21] Appl. No.: 757,795

[22] Filed: Sep. 11, 1991

[51] Int. Cl.$^5$ ............................ G02B 3/08; G02B 5/18
[52] U.S. Cl. .................................... 359/565; 359/356; 359/434; 359/566; 359/569
[58] Field of Search ............... 359/355, 356, 357, 423, 359/424, 434, 435, 558, 565, 566, 569, 570, 571, 741, 742, 13, 14, 16, 19, 630, 637

[56] References Cited

U.S. PATENT DOCUMENTS

| | | | |
|---|---|---|---|
| 3,923,400 | 12/1975 | Hardy | 359/434 X |
| 3,940,204 | 2/1976 | Withrington | 359/19 |
| 4,218,111 | 8/1980 | Withrington et al. | 359/19 X |
| 4,637,697 | 1/1987 | Freeman | 359/565 X |
| 4,679,891 | 7/1987 | Roberts | 359/357 |
| 4,895,790 | 1/1990 | Swanson et al. | 359/570 X |
| 4,936,665 | 6/1990 | Whitney | 359/565 |
| 4,964,686 | 10/1990 | Kato | 359/423 |
| 5,005,960 | 4/1991 | Heimbeck | 359/435 |
| 5,013,133 | 5/1991 | Buralli et al. | 359/558 |
| 5,044,706 | 9/1991 | Chen | 359/357 |
| 5,100,226 | 3/1992 | Freeman | 359/565 X |
| 5,117,306 | 5/1992 | Cohen | 359/565 |

FOREIGN PATENT DOCUMENTS

| | | | |
|---|---|---|---|
| 59-127006 | 7/1984 | Japan | 359/565 |
| 64-44913 | 2/1989 | Japan | 359/14 |
| 2-179604 | 7/1990 | Japan | 359/16 |
| 2072871 | 10/1981 | United Kingdom | 359/355 |

OTHER PUBLICATIONS

C. J. Swanson, W. B. Veldkamp, "Infrared Applications of Diffractive Optical Elements", SPIE Proceedings, vol. 885, Paper No. 22, 1988.

Primary Examiner—Constantine Hannaher
Assistant Examiner—Edward J. Glick
Attorney, Agent, or Firm—Michael W. Sales; Wanda K. Denson-Low

[57] ABSTRACT

A re-imaging optical system (36) is provided which utilizes a combination of refractive and diffractive optical elements. The system includes an objective lens group (38) for focusing an incoming beam of light to a first image plane. A relay lens group (40) refocuses the beam of light in a second image plane after it passes through the first image plane. The relay lens group (40) includes a diffractive optical element (48) for correcting aberrations introduced by the objective and relay lens groups. The diffractive optical element (48) eliminates a number of individual optical elements which would otherwise be required to correct aberrations, thereby reducing the total number of optical elements in the system. In the preferred embodiment, the diffractive optical element (48) comprises a binary optical element. The resulting system yields better image quality, better throughput, and a lighter, less bulky, re-imaging optical system (36).

18 Claims, 7 Drawing Sheets

RE-IMAGING OPTICAL SYSTEM EMPLOYING REFRACTIVE AND DIFFRACTIVE OPTICAL ELEMENTS

BACKGROUND OF THE INVENTION

1. Technical Field

This invention relates to re-imaging optical systems, and more particularly to a re-imaging optical system incorporating a combination of refractive and diffractive optical elements for minimizing aberrations.

2. Discussion

The need to correct optical aberrations is pervasive in a wide variety of optical systems. Refractive and reflective components such as lenses, mirrors and prisms unavoidably introduce numerous kinds of optical aberrations. These include, for example, lateral and axial chromatic aberrations, coma, spherical chromatism, chromatic coma, astigmatism, field (Petzval) curvature, etc.

The more complex an optical system is, the more refractive elements the system requires. This results in an increase in the aberrations induced by these refractive elements. As a result, additional refractive elements are required to correct these aberrations.

For example, many optical systems employing optical sensors need to utilize a re-imaging optical configuration. A re-imaging optical configuration in an optical sensor system offers a number of advantages such as better off-axis radiation rejection, 100 percent cold shielding with the cold stop next to the detector module and an accessible entrance pupil. In general, a re-imaging optical system consists of two modules: an objective group for focusing an incoming beam of light onto an intermediate image plane, and a relay group following the intermediate image. The relay group then transmits the light to the detector. In a focal type re-imaging system, the relay group refocuses the light in a second image plane at the detector. In an afocal system, on the other hand, the relay group will collimate the light for viewing such as is commonly done in telescope systems.

Due to the added optical components in a reimaging optical system, a number of optical aberrations are introduced. For example, to obtain good image quality in a re-imaging optical system, the axial color of both the objective and relay groups have to be individually well corrected. While in principle, the objective group axial color can be removed by the relay group, the required additional negative power in the rear group will upset the third order aberration balances, and in addition will generate additional higher order aberrations. Further, spherical aberration and coma of both the objective and relay groups must be partially corrected within each group. Otherwise, the "stop" shift (non-zero chief height) induced astigmatism cannot be balanced out.

Because of these factors, refractive re-imaging optical systems are generally complicated and require many optical elements. In some cases, lenses with aspheric surfaces are employed. This results in a number of disadvantages. For example, the extra elements add to the cost of the system. In particular, aspheric surfaces which are used to prevent some types of aberrations, are relatively expensive. Further, these extra optical elements add considerably to the bulk and weight of the overall system. In addition, the additional optical elements affect image quality and result in losses in transmission.

For these reasons, it would be desirable to provide a re-imaging optical system which reduces the overall number of optical elements required. To this end, it would be desirable to have optical elements which do not introduce significant aberrations, and which can correct aberrations with a minimum number of components. Further it would be desirable to have a re-imaging optical system which is relatively inexpensive and which has good performance providing high image quality and low transmission losses. In addition it would be desirable to have a re-imaging optical system which is light and can be packaged in a relatively compact space.

SUMMARY OF THE INVENTION

Pursuant to the present invention a re-imaging optical system is provided which utilizes a combination of refractive and diffractive optical elements. The system includes an objective lens group for focusing an incoming beam of light to a first image plane. A relay lens group refocuses the beam of light in a second image plane after it passes through the first image plane. The relay lens groups includes a diffractive optical element for correcting aberrations introduced by the objective and relay lens groups.

The diffractive optical element eliminates a number of individual optical elements which would otherwise be required to correct aberrations, thereby reducing the total number of optical elements in the system. This results in better image quality, better throughput, and a lighter less bulky re-imaging optical system.

BRIEF DESCRIPTION OF THE DRAWINGS

The various advantages of the present invention will become apparent to one skilled in the art by reading the following specification and by reference to the following drawings in which.

DETAILED DESCRIPTION OF THE PREFERRED EMBODIMENT

Figure 1:
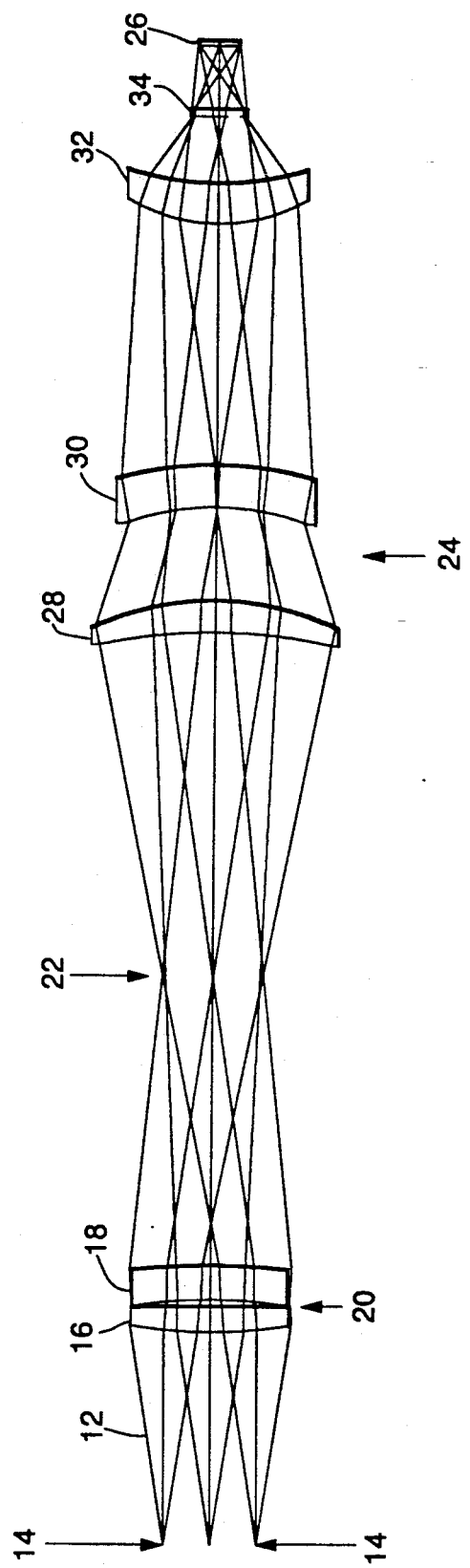
FIG. 1 is a diagram of a re-imaging optical system in accordance with the prior art.

Referring now to FIG. 1 a diagram of a prior art re-imaging optical system 10 is shown. Such re-imaging systems are used in a wide variety of applications, and particularly where a detector is employed. The re-imaging optical system 10 shown in FIG. 1 is an infrared imaging system, such as may be employed in a night vision system. The prior art re-imaging optical system 10 accepts collimated light 12 which enters through an entrance pupil (not shown) which defines the boundaries 14 of the entering light. This light 12 first reaches a silicon lens 16 and then an adjacent germanium lens 18 which together comprise the objective group 20. The purpose of the objective group is to focus the incoming light 12 at an intermediate image plane 22. The relay group 24 receives light 12 after it passes through the intermediate image plane 22 and refocuses it onto a detector 26. The relay group consists of a silicon lens 28 which is a convex - convex type lens used to relay light at the intermediate image plane 22. Next, the relay group 24 consists of a germanium lens 30 which is a concave - concave type lens, used to correct chromatic abberation. Finally, another silicon lens 32 is employed which is a convex - concave type lens used to focus the light after passing the germanium lens 30.

It will be appreciated that to obtain good image quality in the re-imaging optical system 10, the axial color of both the objective group 20 and the relay group 24 must be individually well corrected. If for example, the axial color introduced by the objective group 20 was removed by the relay group 24, the required additional negative power of the germanium (flint glass) in the relay group will upset the third order aberration balances and will generate additional higher order aberrations. This is why the objective group 20 and relay group 24 both contain pairs of silicon and germanium lenses since together these lenses can create an achromate. In addition, it will be appreciated that the spherical aberration and coma of both the objective group 20 and relay group 24 must be partially corrected within each of these groups. This is because if they are not, the "stop shift" (non-zero chief height) induced astigmatism cannot be balanced out. As a result, the re-imaging optical system 10 in accordance with the prior art is relatively complex and requires numerous optical elements.

In addition, the prior art re-imaging optical system 10 includes a cold stop 34 which acts as an aperture to reduce background noise in the infrared image. Typically, the cold stop 34 will be placed at the window of the detector dewer (not shown). The infrared detector 26 then receives the light passing through the cold stop 34.

Figure 2:
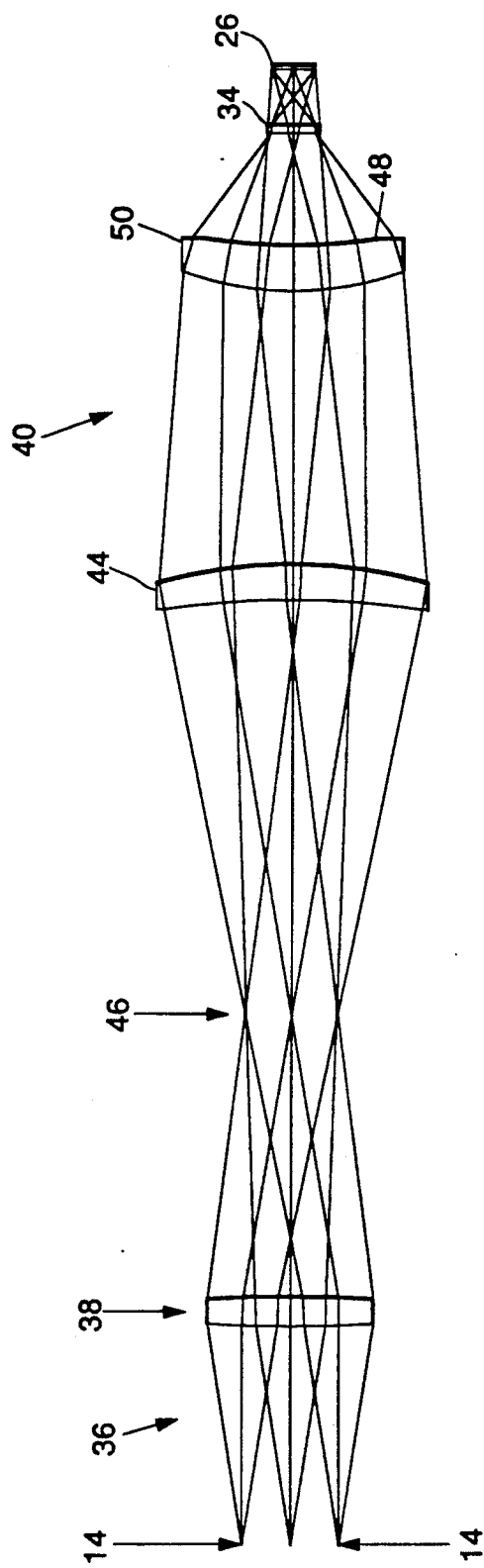
FIG. 2 is a diagram of a re-imaging optical system employing a diffractive optical element in accordance with the present invention.

Referring now to FIG. 2 there is shown a diagram of the re-imaging optical system 36 in accordance with the present invention. The re-imaging optical system 36 retains the functional properties of the prior art system 10 in a much simpler optical form with improved image quality. Further, a 40 percent reduction in the number of elements has been realized. This results in significant weight and cost advantages.

One important feature of the re-imaging optical system 36 is the fact that primary lateral color, secondary lateral color, and coma are self corrected through the "symmetry principle". In particular, the objective group 38 and the relay group 40 are symmetrical with respect to the intermediate image plane resulting in a balancing out of primary lateral color, secondary lateral color, and coma. This results from the use of aspherical silicon lenses 42 and 44 in front of and behind the intermediate image plane 46.

The advantageous use of the symmetry principle in this configuration is made possible because the re-imaging optical system 36 employs a diffractive optical element to correct the axial color of the whole system. The diffractive optical element 48 comprises, in the preferred embodiment, a binary optical element. The diffractive optical element 48 can also be used to correct high order chromatic aberrations such as spherochromatism and chromatic coma. In addition, the diffractive element 48 has a positive optical power contributing a portion of the overall system power. In contrast, classical germanium (flint glass) corrective elements do not contribute to the system power. As a result of the use of the diffractive optical element 48 for chromatic aberration correction, the intrinsic aberrations of each element in the optical system 36 are significantly reduced. Consequently, the aberration correction of the whole system is greatly simplified.

Those skilled in the art will appreciate that diffractive optical elements such as binary optical elements in general, can be made to behave in a similar fashion to refractive optical elements. For example, magnifying power may be encoded on the binary optical element 48 with a zone plate structure with an effective focal length that meets the system's requirements. It will be appreciated that prismatic power can be employed also when necessary.

Figure 3:
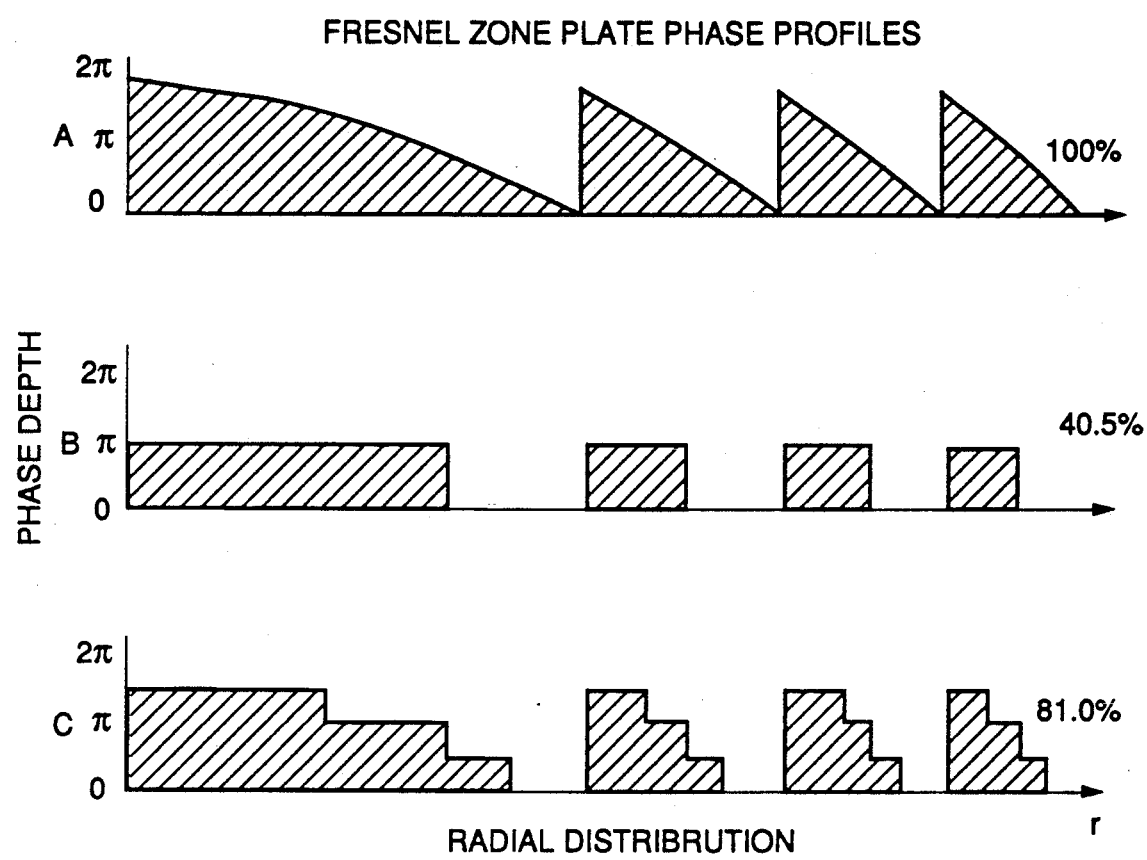
FIG. 3 is a diagram of a series of Fresnel zone plate phase profiles.

In more detail, the zone plate structure in the binary optical element 48 necessary to generate magnifying power is a form of a Fresnel zone plate. Further details about binary optical elements may be found in the publication: G. Swanson and W. Veldcamp, "Infrared Applications of Diffractive Optical Elements", SPIE Proceedings, Volume 885, Paper No. 22, 1988. This article is incorporated herein by reference. As discussed in this reference, a Fresnel zone plate face profile needed to achieve 100 percent efficiency requires curved wedge shaped structures with a height, or phased depth, of $2\pi$. FIG. 3 at the top shows an example of such a Fresnel plate phase profile needed to achieve 100% efficiency. The $2\pi$ phase depths corresponds to a material etch depth of about $2\mu$ for mid-infrared radiation.

It should be noted that this phase depth is proportional to the wavelength. For infrared wavelengths, the diamond—turned optics technology is used to produce a continuous curved phase profile. For visible wavelengths, the technology to produce a continuous curved phase profile does not exist. Thus, as an approximation of this desired phase profile, the ideal continuous Fresnel zone plate phase profile can be approximated by quantisizing into discrete phase levels. The diffraction efficiency will be a function of the number of phase levels. In FIG. 3, the middle and bottom curves show the Fresnel zone plate phase profile quantized to two and four phase levels respectively. The two level profile results in an efficiency of 40.5% and the four level profile results in an efficiency of 81.0%. For these elements to be useful in infrared systems, it is necessary to achieve a diffraction efficiency of 90% or greater. Diffraction efficiencies in excess of 90 percent can be achieved by using, for example, integrated circuit fabrication techniques such as high resolution lithography, mask aligning and reactive ion etching.

The zone plates structure of the binary optical element 48 can be very general to permit the binary optical element 22 to perform such functions as aberration reduction and distortion correction. The zone plate structure can be expressed by any set of polynomial forms with or without any symmetry. The practical limitation is the smallest feature size of the binary optical element 48, which is about one micron (1 $\mu$m) for the current technology. With the ability to provide such correction with the binary optical element 48, very good image quality in a system can be obtained despite the use of only a single binary optical element 48. It should be noted that the binary optical element 48 using a Fresnel zone plate is a diffractive optical element and should not be confused with Fresnel lenses which are refractive lens elements.

The desired optical characteristics of the binary optical elements utilized in accordance with the present invention can be derived using conventional lens design techniques, or using well known lens design programs. Further, the above referenced article by Swanson and Veldkamp gives further details on the use of lens design programs to optimize parameters in the diffractive phase profile for binary optical elements. Commercial binary optical element manufacturing firms may be used to construct the binary optical elements from the formulas derived. For example, Hughes Danbury Optical Systems, division of Hughes Aircraft Company in Danbury, Conn., is an example of a manufacturing company capable of transforming these designs formulas into working binary optical elements.

The spherical aberration and coma of both the objective group 38 and the relay group 40 are corrected by employing aspherical surfaces in lenses 42 and 44. Astigmatism is corrected by disposing lens elements in the proper positions with adequate power distribution. The field curvature, or petzval curvature, is significantly reduced as compared to the equivalent prior art system 10 as a result of employing diffractive optical element 48 and judicious glass selection.

In this regard, it is notable that a germanium lens 50 is employed as the last refractive optical element in the system 36. This is a convex - concave type lens used to reduce field curvature. If a germanium lens such as the one 50 in the system 36 were employed in the prior art system 10 as the last element, significant chromatic aberration would result. The reason for using germanium is that it has a high index of refraction, which will reduce the petzval curvature. But, it will also introduce chromatic aberration. However, in the re-imaging optical system 36 in the present invention, the germanium lens 50 can be used in combination with the diffractive optical element 48 to reduce the petzval curvature while chromatic aberrations are corrected by the diffractive optical element 48. In accordance with the preferred embodiment the binary optical element 48 is attached to the rear surface of the lens 50.

Figure 4:
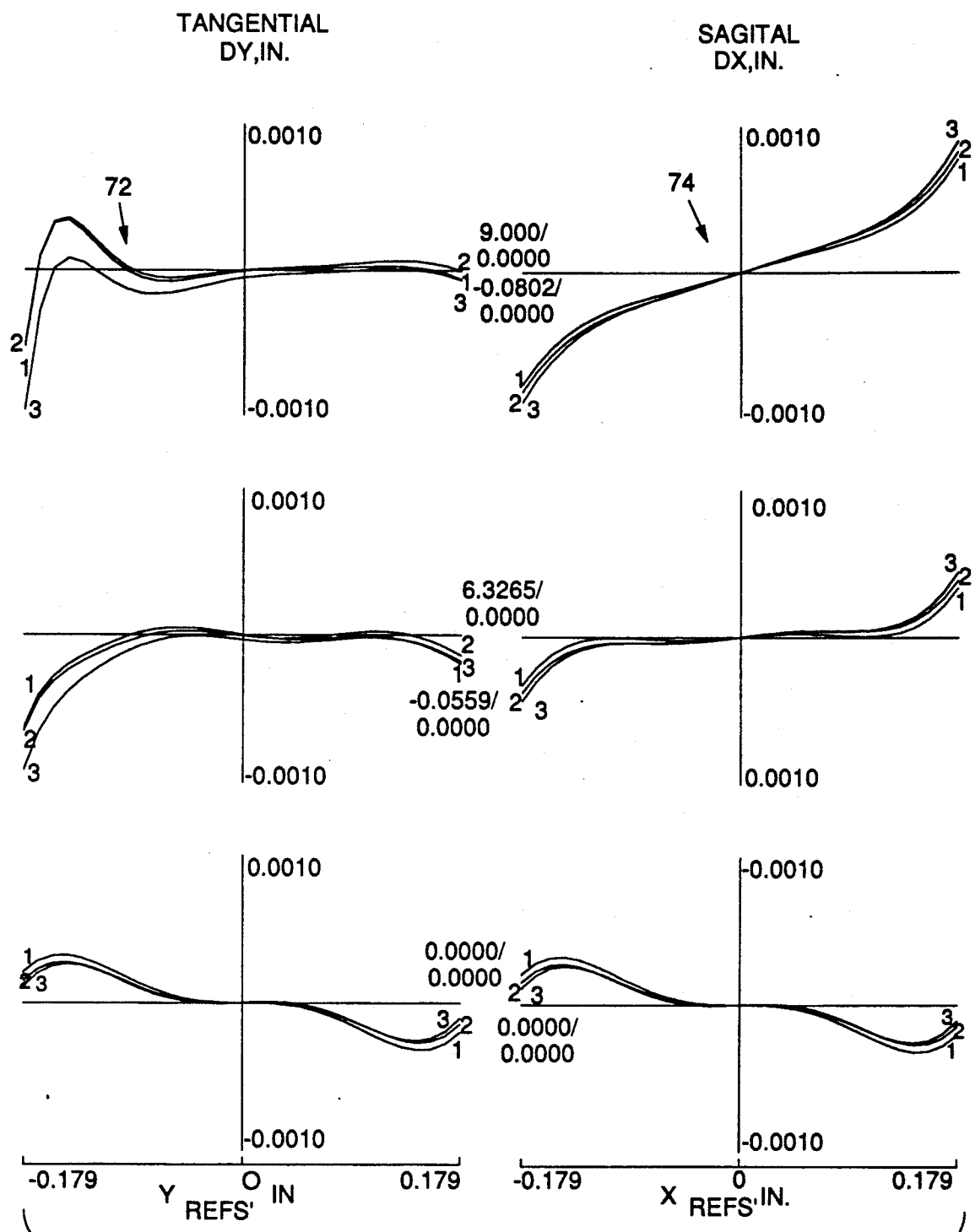
FIG. 4 depicts a series of H-tanU curves indicating the performance of the prior art re-imaging optical system shown in FIG. 1.

Referring now to FIG. 4 there is shown H-tanU curves indicating the performance of a typical prior art re-imaging optical system such as the one shown in FIG. 1. It will be appreciated that H-tanU curves are an important way to evaluate the performance of an optical system. In particular, by tracing a series of rays from the entrance pupil such as 14, shown in FIG. 1 to the image plane, the deviation from the desired focal point for each ray can be plotted. Thus, the "Tangential curves" plot the y position across the entrance pupil along the x axis and the deviation (dy) from the ideal image point on the y axis. Likewise, the "Sagittal" curves 54 plot the x position of the incoming rays along the entrance pupil on the x axis and the error (dx) from ideal image point on the y axis. Thus, in an ideal optical system there would be zero error and all of the curves would lay along the dy=0 line 56 in the Tangential curves 52 and along the dx=0 line 58 in the Sagittal curves 54. There are three sets of Tangential curves, and three set of Sagittal curves. The first sets of Tangential curves 60 represent H-tanU curves at a nine degrees of incidence. Likewise, the top set of Sagittal curves 62 also represent rays at in nine degree angle of incidence.

Accordingly, the middle set of Tangential curves 64 and the middle set of Sagittal curves 66 represent rays entering at a 6.3265 angle of incidence. The bottom Tangential curves 68 and bottom sagittal curves 70 represent rays entering at a zero degree angle of incidence. In each of these sets of curves there are three lines labeled 1, 2 and 3 which represent incident light at three different wavelengths. For example, in the particular data shown in FIG. 3, curve one is measured with light at a wavelength of 3.8 μm, curve two has wavelength of 3.6 μm and curve three has a wavelength of 4.2 μm.

Thus, in summary, it can be seen that the Tangential curves 52 and Sagittal curves 54 represent a measure of geometrical aberration in an image. In addition, the differences between each of the three wavelength curves 1, 2, and 3 give an indication of the chromatic aberration of the optical system. In general, it can be seen that the geometrical and chromatic aberration increases toward the edges of the entrance pupil and is at a minimum for the central rays.

Figure 5:
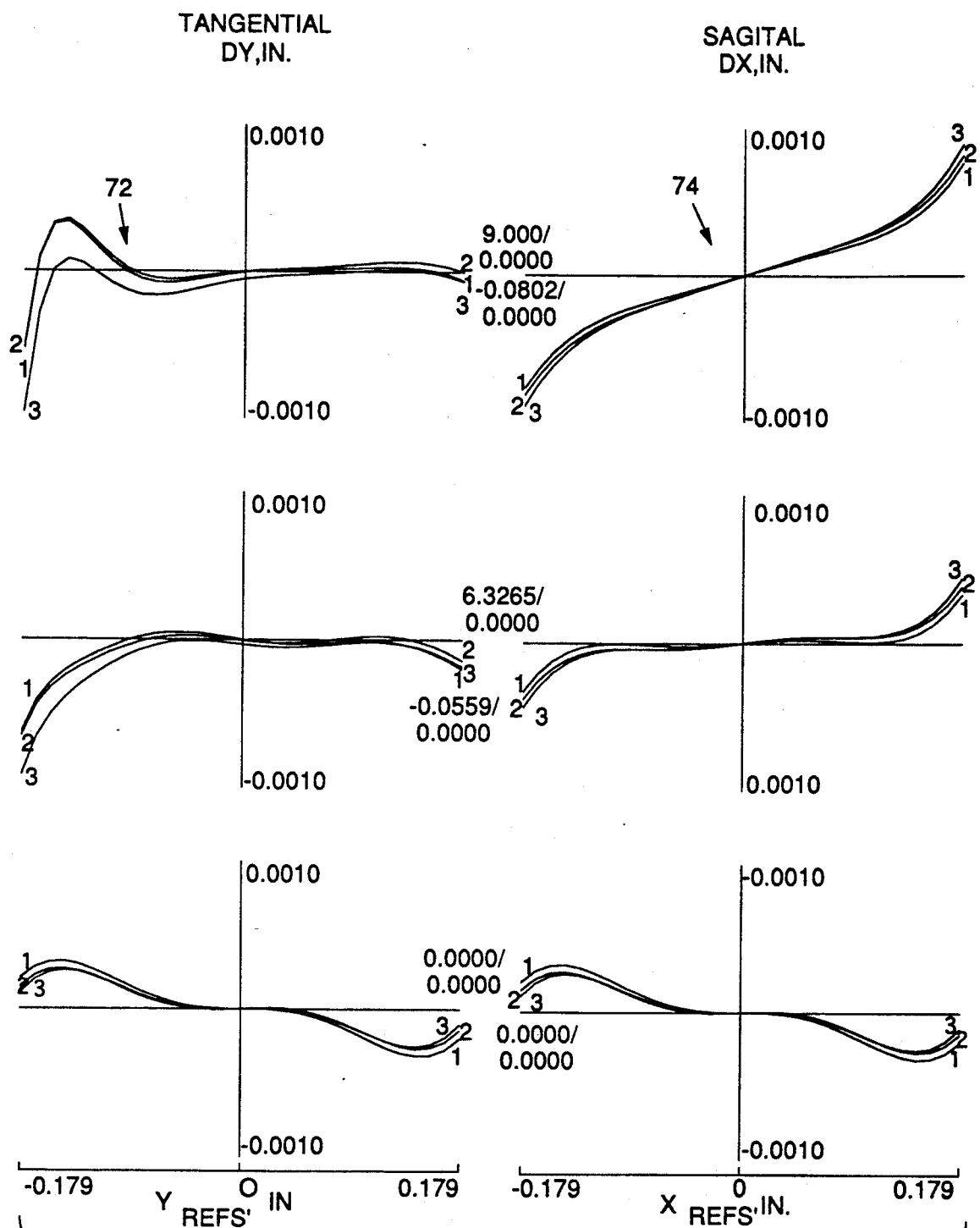
FIG. 5 depicts a series of H-tanU curves showing the performance of the optical system in accordance with the present invention depicted in FIG. 2.

Referring now to FIG. 5, H-tanU curves are shown for the re-imaging optical system 36 in accordance with the present invention. FIG. 5 shows a series of Tangential curves 72 and Sagittal curves 74 at the same angles of incidence and same wavelengths as the curves in FIG. 4. It can be seen that in each case, the values of dy and values of dx are considerably lower than in the prior art re-imaging optical system curves shown in FIG. 4. This indicates superior performance with less geometrical and chromatic aberration.

Figure 6:
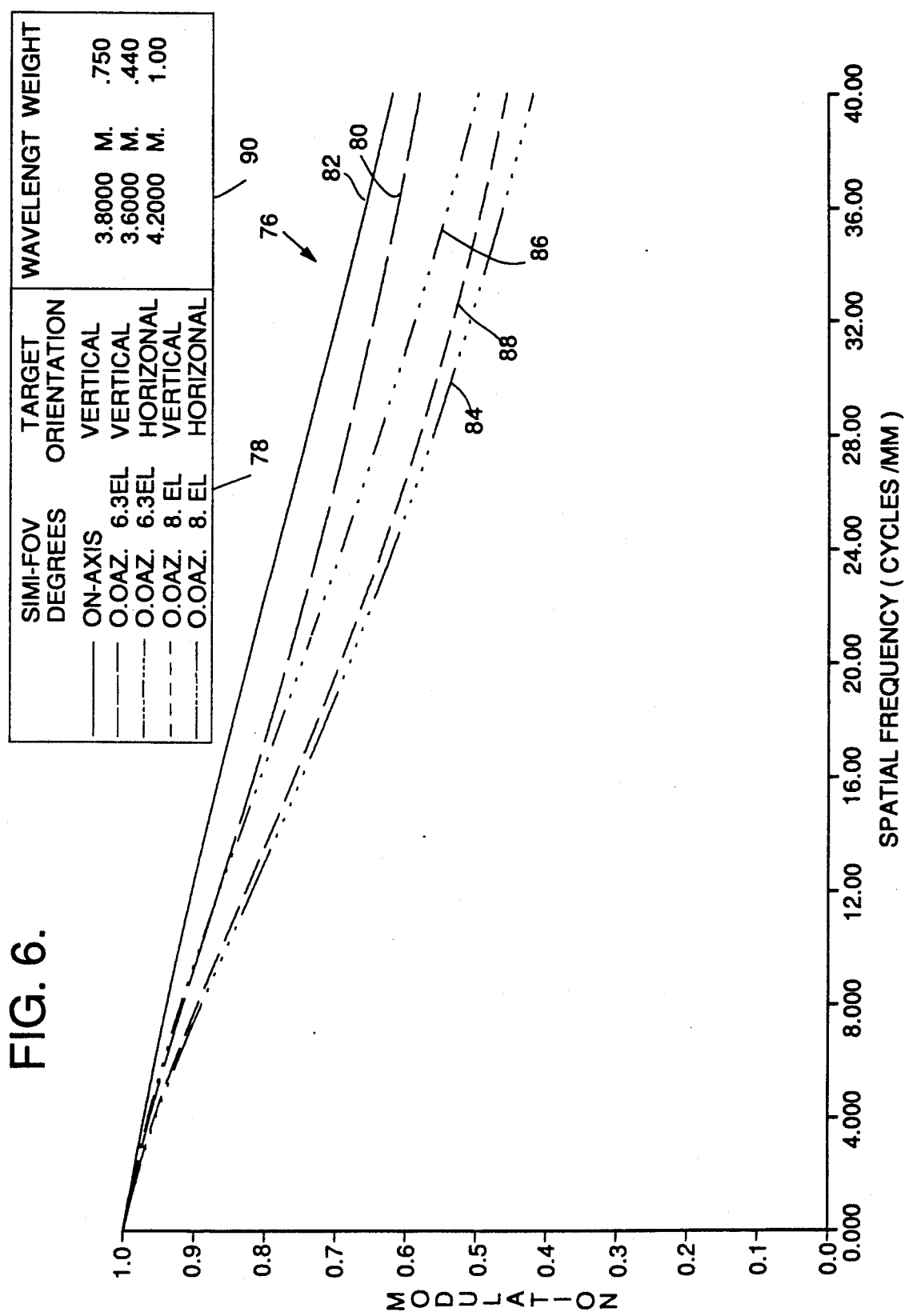
FIG. 6 shows a series of modulation transfer function curves for the prior art re-imaging optical system shown in FIG. 1.

Another measure of the performance of optical systems is the modulation transfer function curve. In FIG. 6, the modulation transfer function curves of the prior art system shown in FIG. 1 are depicted. Spatial frequency is plotted along the x axis and modulation is plotted along the y axis. In general terms, modulation transfer function curves measure the reduction in contrast between light and dark areas in an image as spatial frequency increases. Spatial frequency is plotted along the x axis in units of cycles per millimeter, which indicates how many dark bars in a light and dark grid occur per millimeter. Modulation, plotted on the y axis, is calculated by the intensity of the bright areas or bars, minus the intensity of the dark bars divided by the intensity of the bright plus the intensity of the dark bars.

The modulation transfer function curves 76 in FIG. 6 depict five different curves measured at five different elevations and target orientations. Thus, as explained in the legend 78, at the top of FIG. 6, the solid curve 80 represents an on axis ray having a vertical orientation. That is, the light and dark bars are orientated in a vertical direction. The second curve comprising dashes and dots 82 is measured at 6.3 degree elevation and zero degree azimuth with the target oriented vertically. The third curve 84 depicted by a series of long dashes is measured with the incident light at a 6.3 degree elevation with the target oriented horizontally. The fourth curve 86 consisting of dots and long dashes is measured with an incident beam at 8.1 degree elevation and the target oriented vertically. Finally, the last curve 88, consisting of short dashes, is measured with the incident beam at 8.1 degree elevation, and the target orientation horizontal. The characteristic of a wavelength of light used in these measurements is depicted in the legend 90 at the top of FIG. 6 which indicates that non-uniform weighting factors for different wavelengths are applied in MTF computation. In general terms, it can be seen that the prior art re-imaging system 10 yields modulation transfer function curves in which the modulation drops from 1.0 at zero spatial frequency to about 0.5 at about a spatial frequency of 40.

Figure 7:
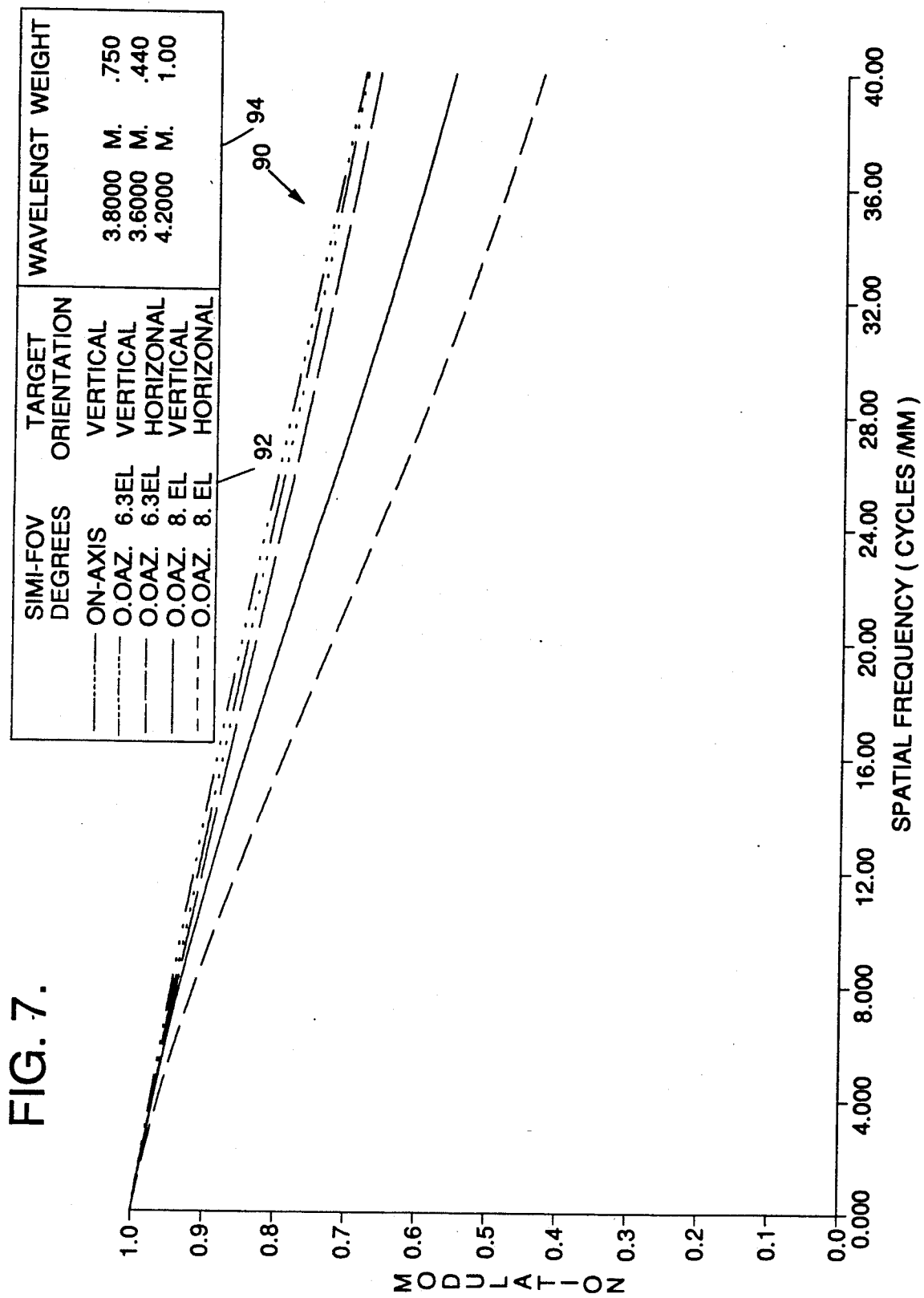
FIG. 7 shows a series of modulation transfer function curves for the re-imaging optical system in accordance with the present invention shown in FIG. 2.

The modulation transfer function curves 90 for the re-imaging optical system 36, in accordance with the present invention are depicted in FIG. 7. These measurement were taken under conditions and the light curves depict the same off axis angles as shown in FIG. 6 as shown in the legends 92 and 94. As can be seen, all of the curves in the modulation transfer function curves 90 exhibit higher modulation throughout the range up to the maximum spatial frequency of 40. In sum, these curves indicate that the re-imaging optical system 36 is producing a higher quality image, particularly for fine details such as those having a spatial frequency up to forty cycles per millimeter.

From the foregoing, it can be seen that the use of the binary optical element 48 in a re-imaging optical system greatly improves the design flexibility of the system, by providing optical power as well as aberration correction without introducing aberration. Also, this system results in a re-imaging optical system having fewer overall number of optical elements. This results in a reduction in the aberrations, a reduction in transmission losses and an increase in image quality. Further, as a result, the system can be constructed at lower cost, weighs less and occupies less space. Further, it will be appreciated that the system can be employed in systems which are focal as shown in the preferred embodiments, or in afocal systems such as certain telescope systems. In addition, the system can be employed and a wide variety of spectral ranges from the ultra violet to the infrared.

Those skilled in the art can appreciate that other advantages can be obtained from the use of this invention and that modifications can be made without departing from the true spirit of the invention after studying the specification, drawings and following claims.

I claim:

1. A re-imaging optical system comprising:
   an objective lens means for focusing an incoming beam of light to a first image plane;
   a relay lens means for refocusing said beam of light in a second image plane after it has passed through said first image plane; and
   said relay lens means including a binary optical element which introduces magnifying power in addition to any magnifying power introduced by refraction in the relay lens, the binary optical element also correcting aberrations introduced by said objective and relay lens means.

2. The re-imaging optical system of claim 1 wherein said objective lens means and said relay lens means both contain similar optical elements which tend to balance out their respective aberrations according to the symmetry principle.

3. The re-imaging optical system of claim 2 wherein said objective lens means and said relay lens means both contain silicon refractive lenses.

4. The re-imaging optical system of claim 3 wherein said silicon lenses contained in said objective and relay lens means are both aspherical lenses.

5. The re-imaging optical system of claim 1 wherein said relay optical lens means includes a germanium lens.

6. The re-imaging optical system of claim 1 wherein said binary optical element contains a Fresnel zone plate attached to a lens in said relay lens means, wherein said binary optical element provides chromatic aberration correction.

7. The re-imaging optical system of claim 6 wherein said binary optical element also corrects spherochromatism.

8. The re-imaging optical system of claim 6 wherein said binary optical element also corrects chromatic coma.

9. The re-imaging optical system of claim 1 wherein said beam of light is infrared light.

10. An optical system comprising:
    a first lens means for focusing an incoming beam of light to an image plane;
    a second lens means for receiving and refracting said beam of light after it passes through said image plane;
    said first and second lens means together being partially self correcting of aberrations according to the symmetry principle, whereby the aberrations in said first and second lens means tend to balance each other out; and
    a binary optical element in the path of said beam of light which introduces magnifying power in addition to any magnifying power introduced by refraction in the second lens means the binary optical element also correcting a portion of the optical aberrations not corrected by said first and second lens means.

11. The optical system of claim 10 further comprising a detector for receiving said beam of light after it is refracted by said second lens means.

12. The optical system of claim 10 wherein said second lens means refocuses said beam of light.

13. The optical system of claim 10 wherein said aberrations corrected by said first and second lens means include lateral color and coma.

14. The optical system of claim 13 wherein said portion of optical aberrations corrected by said binary optical element includes axial color.

15. The optical system of claim 10 wherein said first and second lens means both comprise silicon lenses.

16. The optical system of claim 10 wherein said first and second lens means both comprise aspherical lenses.

17. The optical system of claim 16 wherein said second optical system includes silicon and germanium lenses.

18. A re-imaging optical system comprising:
    an objective lens means for focusing an incoming beam of infrared light to a first image plane;
    a relay lens means for refocusing said beam of light in a second image plane after it has passes through said first image plane;
    said objective lens means and said relay lens means both containing silicon aspherical refractive lenses which tend to balance out their respective aberrations according to the symmetry principle;
    said relay lens means including a binary optical element including a Fresnel zone plate attached to a lens in said relay lens means;
    said binary optical element providing magnifying power in addition to any magnifying power introduced by refraction in the relay lens, the binary optical element also providing chromatic aberration correction; and
    a detector means for receiving said beam of light after it is refocused by said relay lens means.

* * * * *